US012779690B2

(12) United States Patent
Wahrmann Lockhart et al.

(10) Patent No.: US 12,779,690 B2
(45) Date of Patent: Nov. 3, 2026

(54) ALIGNING TWO ROBOT ARMS RELATIVE TO ONE ANOTHER

(71) Applicant: FRANKA EMIKA GMBH, Munich (DE)

(72) Inventors: Daniel Wahrmann Lockhart, Munich (DE); Andreas Spenninger, Karlsfeld (DE); Mohamadreza Sabaghian, Munich (DE); Christoph Jähne, Munich (DE); Zheng Qu, Augsburg (DE); Thore Goll, Munich (DE); Ahmed Wafik, Munich (DE); Benjamin Loinger, Munich (DE); Christoph Kugler, Munich (DE); Carles Calafell Garcia, Munich (DE)

(73) Assignee: FR ADMINISTRATION GMBH, Munich (DE)

( * ) Notice: Subject to any disclaimer, the term of this patent is extended or adjusted under 35 U.S.C. 154(b) by 600 days.

(21) Appl. No.: 17/426,514

(22) PCT Filed: Feb. 3, 2020

(86) PCT No.: PCT/EP2020/052538
§ 371 (c)(1),
(2) Date: Jul. 28, 2021

(87) PCT Pub. No.: WO2020/161039
PCT Pub. Date: Aug. 13, 2020

(65) Prior Publication Data

US 2022/0097233 A1 Mar. 31, 2022

(30) Foreign Application Priority Data

Feb. 5, 2019 (DE) ..................... 10 2019 102 803.5

(51) Int. Cl.
*B25J 9/16* (2006.01)

(52) U.S. Cl.
CPC ........... *B25J 9/1676* (2013.01); *B25J 9/1671* (2013.01); *B25J 9/1682* (2013.01); *G05B 2219/39001* (2013.01); *G05B 2219/40339* (2013.01)

(58) Field of Classification Search
CPC ...... B25J 9/1676; B25J 9/1671; B25J 9/1682; B25J 9/1605; B25J 9/1666;
(Continued)

(56) References Cited

U.S. PATENT DOCUMENTS

2018/0036882 A1 2/2018 Kimura
2020/0376663 A1* 12/2020 Voelz ..................... B25J 9/1669

FOREIGN PATENT DOCUMENTS

DE 19625637 A1 1/1998
DE 102012103830 A1 11/2012
(Continued)

OTHER PUBLICATIONS

Z. Li, D. Glozman, D. Milutinovic and J. Rosen, "Maximizing dexterous workspace and optimal port placement of a multi-arm surgical robot," 2011 IEEE International Conference on Robotics and Automation, Shanghai, China, 2011, pp. 3394-3399, doi: 10.1109/ICRA.2011.5980270 (Year: 2011).*
(Continued)

*Primary Examiner* — Adam R Mott
*Assistant Examiner* — Matthew C Gammon
(74) *Attorney, Agent, or Firm* — Hoffmann & Baron, LLP

(57) ABSTRACT

A simulation method of specifying a relative position between a first base of a first robot manipulator and a second base of a second robot manipulator, including: determining a first working area of the first robot manipulator, wherein the first working area determines a finite plurality of tuples from possible positions of the first end effector and possible orientations of the first end effector in respective positions of
(Continued)

the first end effector; determining, for each of a specified plurality of possible relative positions between the first base and the second base, a number of the tuples from the first working area as evaluation variables, for which a second end effector is capable of being positioned in a predefined orientation and/or at a predefined distance relative to the first end effector; and determining and outputting the relative position between the first base and the second base with a highest evaluation variable.

11 Claims, 3 Drawing Sheets

(58) Field of Classification Search
CPC .......... G05B 2219/39001; G05B 2219/40339; G05B 2219/39124
See application file for complete search history.

(56) References Cited

FOREIGN PATENT DOCUMENTS

| | | | |
|---|---|---|---|
| DE | 102015116522 | B3 | 10/2016 |
| DE | 102017129665 | B3 | 1/2019 |
| EP | 1498792 | A2 | 1/2005 |
| EP | 2561964 | A1 | 2/2013 |
| JP | H 05-324034 | A | 12/1993 |

OTHER PUBLICATIONS

Mirrazavi, Sina & Figueroa, Nadia & Billard, Aude. (2016). Coordinated multi-arm motion planning: Reaching for moving objects in the face of uncertainty. 0.15607/RSS.2016.XII.019. (Year: 2016).*
B. Cao, G. I. Dodds and G. W. Irwin, "Optimal placement and grasping of two robot arms holding a common object based on workspace usage," SMC'98 Conference Proceedings. 1998 IEEE International Conference on Systems, Man, and Cybernetics, San Diego, CA, USA, 1998, pp. 3353-3358 vol. 4 (Year: 1998).*
Alonso-Mora J, Baker S, Rus D. Multi-robot formation control and object transport in dynamic environments via constrained optimization. The International Journal of Robotics Research. 2017;36(9):1000-1021. (Year: 2017).*
M. Hassan, D. Liu and G. Paul, "Modeling and stochastic optimization of complete coverage under uncertainties in multi-robot base placements," 2016 IEEE/RSJ International Conference on Intelligent Robots and Systems (IROS), Daejeon, Korea (South), 2016, pp. 2978-2984, doi: 10.1109/IROS.2016.7759461. (Year: 2016).*
Long Tao and Zhigang Liu, "Optimization on multi-robot workcell layout in vertical plane," 2011 IEEE International Conference on Information and Automation, Shenzhen, 2011, pp. 744-749, doi: 10.1109/ICINFA.2011.5949092. (Year: 2011).*
Hassan, M., Liu, D. & Paul, G. Collaboration of Multiple Autonomous Industrial Robots through Optimal Base Placements. J Intell Robot Syst 90, 113-132 (2018). (Year: 2018).*
English-language translation of International Preliminary Report on Patentability issued in International Application No. PCT/EP2020/052538 on Aug. 19, 2021.
Tao, Long, et al., "Optimization on Multi-Robot Workcell Layout in Vertical Plane", Proceeding of the IEEE, Intl. Conference on Information and Automation, pp. 744-749, China, Jun. 2011.

* cited by examiner

ALIGNING TWO ROBOT ARMS RELATIVE TO ONE ANOTHER

CROSS-REFERENCE TO RELATED APPLICATIONS

The present application is the U.S. National Phase of PCT/EP2020/052538, filed on 3 Feb. 2020, which claims priority to German Patent Application No. 10 2019 102 803.5, filed on 5 Feb. 2019, the entire contents of which are incorporated herein by reference.

BACKGROUND

Field

The invention relates to a simulation method for specifying a relative position between a first base of a first robot manipulator and a second base of a second robot manipulator, as well as a simulation computing unit for specifying a relative position between a first base of a first robot manipulator and a second base of a second robot manipulator.

Related Art

In particular, if a load that is too heavy or too bulky for a single robot manipulator is to be moved by a single stationary robot manipulator, it makes sense to interconnect two individual robot manipulators to move the load together. Other tasks are also advantageously solved cooperatively by several individual robot manipulators or by a robot system with two robot manipulator arms. In both cases, the question of initial positioning arises, i.e., in the case of individual robot manipulators, how a base of the first robot manipulator is to be optimally positioned relative to the second robot manipulator, or in the case of a single robot system with two robot manipulator arms, how the respective bases of the robot manipulator arms are to be optimally positioned relative to each other. Due to the similarity of the problems in both cases, a respective robot manipulator arm is referred to as a respective robot manipulator in the following, also in the case of a robot system with two robot manipulator arms. The term robot manipulator therefore refers, in particular, to a robot manipulator arm, regardless of whether each robot manipulator can be operated individually and has its own control unit, or whether both robot manipulators are controlled by a single control unit and are arranged on a common platform.

SUMMARY

The object of the invention is to provide technical support for the stationary alignment of a first robot manipulator with respect to a second robot manipulator.

The invention results from the features of the independent claims. Advantageous further developments and embodiments are the subject of the dependent claims.

An aspect of the invention relates to a simulation method of specifying a relative position between a first base of a first robot manipulator and a second base of a second robot manipulator, wherein the simulation method includes: determining a first working area of the first robot manipulator, wherein the first working area determines a finite plurality of tuples from possible positions of a first end effector and possible orientations of the first end effector at the respective positions of the first end effector; determining, for each of a specified plurality of possible relative positions between the first base and the second base, a number of the tuples from the first working area as evaluation variables, for which a second end effector of the second robot manipulator is capable of being positioned in a predefined orientation and/or at a predefined distance relative to the first end effector; and determining and outputting the relative position between the first base and the second base with a highest evaluation variable is determined and output.

In particular, the simulation method is a computer-implemented method.

A tuple uniquely describes a pair of position and orientation of the first end effector. One and the same orientation of the first end effector at two different positions therefore leads to two tuples. By determining a finite number of tuples, a first working area results as a finite list of tuples, where each list entry, that is, a particular one of the tuples, describes a particular and unique combination of position and orientation of the first end effector.

Both the first robot manipulator and the second robot manipulator, preferably each include a plurality of links, the links being interconnected by joints such that the links are each rotatable or displaceable or tiltable in pairs about a joint. Preferably, the respective joints are connected to actuators that allow the rotating, or the tilting, or the displacing of the links against each other by control.

In particular, the respective base of the respective robot manipulator designates the most proximal link of a robot manipulator. In particular, the base is immobile with respect to an installation surface of the respective robot manipulator, such as a floor or a tabletop or a trolley.

The determination of the plurality of possible positions of the first end effector is thereby preferably performed by a simulation over the entire reachable geometric range of the first end effector. Preferably, the possible positions are stored at discrete intervals so that, in particular, a grid with possible positions of the first end effector is created. The possible positions of the first end effector are limited, in particular, by the geometrically reachable space of the first end effector.

Preferably, all the tuples of position and orientation of the first end effector are considered, in particular, for which the second end effector of the second robot manipulator can be positioned and aligned in a predetermined orientation and/or at a predetermined distance relative to the first end effector. That is, positions and orientations of the first end effector in the first working area of the first robot manipulator are sought for which the second end effector of the second robot manipulator can also be positioned and aligned at a predetermined distance and/or in a predetermined orientation, in each case relative to the first end effector, by the geometric constraints of the respective members of the respective robot manipulator. This advantageously ensures that a load in the poses of interest of the first robot manipulator can be contacted by the first end effector and by the second end effector at the same time. If this is the case, the corresponding tuple is included in the evaluation variable.

The evaluation variable is therefore a measure of the shared working area in which the first end effector and the second end effector can cooperatively complete a task. The larger this measure is, the larger the shared working area is, and the more diverse tasks can be cooperatively performed by the first robot manipulator with the second robot manipulator.

It is an advantageous effect of the invention that a relative position between two bases of two robot manipulators is optimally calculated to the extent that the largest possible number of cooperative positions of the end effectors of the robot manipulators with respect to each other is determined.

According to an advantageous embodiment, the simulation computing unit is for specifying a relative position and a relative orientation between the first base of the first robot manipulator and the second base of the second robot manipulator, wherein the evaluation variable is determined for each of a specified plurality of possible relative positions and possible relative orientations between the first base and the second base, wherein that relative position and relative orientation between the first base and the second base having the highest evaluation variable is determined and output. The relative orientation between the first base and the second base is preferably described by a set of differential position angles.

According to another advantageous embodiment, in determining the evaluation variable, a check is made to determine whether a collision occurs between the first robot manipulator and the second robot manipulator.

In particular, if it is determined that a collision would occur, this corresponding tuple is not included in the evaluation variable. Preferably, checking whether a collision occurs between the first robot manipulator and the second robot manipulator is performed by modeling geometric bodies and the imaginary arrangement of the geometric bodies on members of the first robot manipulator and on members of the second robot manipulator and by checking for a possible geometric overlap of the respective geometric bodies. By modeling geometric bodies, in addition to the collision check, a safety distance can advantageously be included, which the first robot manipulator should not fall below relative to the second robot manipulator and vice versa. Furthermore, this type of collision check offers an efficient way with regard to computing time and computing effort.

According to a further advantageous embodiment, the possible relative orientations and/or the possible relative positions between the first base and the second base are predetermined from the specified plurality in a grid, preferably in an equidistant grid.

According to a further advantageous embodiment, the possible relative orientations and/or the possible relative positions between the first base and the second base from the given plurality can be specified by constrained nonlinear optimization.

Preferably, the constrained nonlinear optimization includes a sequence of quadratic optimization. In particular, the sequence of quadratic optimization represents an extension to a gradient-based optimization method in that, in addition to the local derivatives of an objective function, curvatures of the objective function are also taken into account, at least locally. According to a further advantageous embodiment, the constrained nonlinear optimization includes an evolution algorithm.

According to a further advantageous embodiment, a constraint of the nonlinear optimization is an intersection of the geometric maximum reachable spaces of the first end effector and the second end effector.

According to a further advantageous embodiment, a second working area of the second robot manipulator is determined, the second working area specifying a finite plurality of tuples of possible positions of the second end effector and possible orientations of the second end effector at the respective positions of the second end effector, wherein a constraint of the nonlinear optimization is formed based on an intersection of the first working area of the first robot manipulator and the second working area of the second robot manipulator.

According to a further advantageous embodiment, the predefined orientation of the second end effector relative to the first end effector is defined by a half rotation about a reference point of the first end effector such that the first end effector and the second end effector point symmetrically to each other. In particular, the half rotation represents a 180° rotation about a vertical axis.

Another aspect of the invention relates to a simulation computing unit to specify a relative position between a first base of a first robot manipulator and a second base of a second robot manipulator, wherein the simulation computing unit is configured to: determine a first working area of the first robot manipulator, wherein the first working area specifies a finite plurality of tuples of possible positions of a first end effector and possible orientations of the first end effector at the respective positions of the first end effector; determine, for each of a specified plurality of possible relative positions between the first base and the second base, a number of the tuples from the first working area as evaluation variables for which a second end effector of the second robot manipulator is capable of being positioned in a predefined orientation and/or at a predefined distance in each case relative to the first end effector; and determine and output the relative position between the first base and the second base with the highest evaluation variable.

According to a further advantageous embodiment, the simulation computing unit is configured to be used to specify a relative position and a relative orientation between the first base of the first robot manipulator and the second base of the second robot manipulator; determine an evaluation variable for each of a specified plurality of possible relative positions and possible relative orientations between the first base and the second base; and determine and output the relative position and relative orientation between the first base and the second base having a highest evaluation variable.

According to a further advantageous embodiment, the simulation computing unit is a control unit of the first robot manipulator. According to a further advantageous embodiment, the simulation computing unit is a control unit of the second robot manipulator.

Advantages and preferred further developments of the proposed simulation computer unit result from an analogous and corresponding transfer of the explanations given above in connection with the proposed simulation method.

Further advantages, features and details result from the following description, in which—if necessary with reference to the drawings—at least one example embodiment is described in detail. Identical, similar, and/or functionally identical parts are provided with the same reference signs.

The representations in the figures are schematic and not to scale.

DETAILED DESCRIPTION

Figure 1:
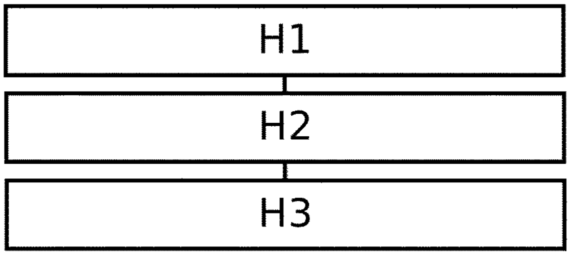
FIG. 1 shows a method of specifying a relative position and relative orientation between a first base of a first robot manipulator and a second base of a second robot manipulator according to an embodiment of the invention.

FIG. 1 shows a simulation method of specifying a relative position and a relative orientation between a first base 11 of a first robot manipulator 10 and a second base 21 of a second robot manipulator 20, wherein the simulation method includes: determining (H1) a first working area of the first robot manipulator 10 , wherein the first working area determines a finite plurality of tuples from possible positions of a first end effector 12 and possible orientations of the first end effector 12 at respective positions of the first end effector 12; determining (H2), for each of a specified plurality of possible relative positions and possible relative orientations between the first base 11 and the second base 21, a number of the tuples from the first working area as evaluation variables, for which a second end effector (22) of the second robot manipulator (20) is capable of being positioned in a predefined orientation and/or at a predefined distance relative to the first end effector (12); and determining and outputting (H3) the relative position between the first base (11) and the second base 21 with a highest evaluation variable.

Figure 2:
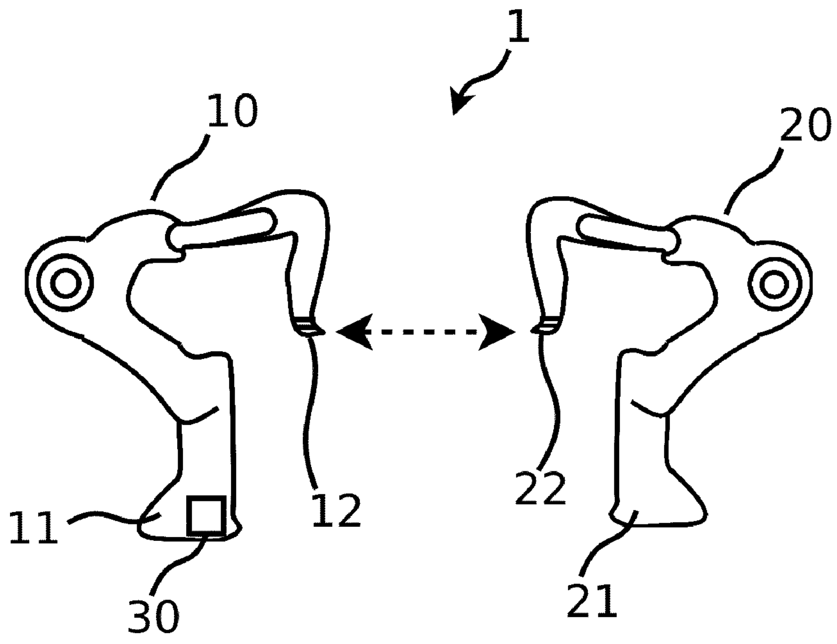
FIG. 2 shows a system to specify a relative position and relative orientation between a first base of a first robot manipulator and a second base of a second robot manipulator according to a further embodiment of the invention.

FIG. 2 shows a system 1 to specify a relative position and relative orientation between a first base 11 of a first robot manipulator 10 and a second base 21 of a second robot manipulator 20.

In particular, there is shown a simulation computing unit 30 to specify a relative position and relative orientation between the first base 11 of the first robot manipulator 10 and the second base 21 of the second robot manipulator 20, wherein the simulation computing unit 30 is a control unit of the first robot manipulator 10. The simulation computing unit 30 is configured to: determine a first working area of the first robot manipulator 10, wherein the first working area specifies a finite plurality of tuples of possible positions of the first end effector 12 and possible orientations of the first end effector 12 at respective positions of the first end effector 12; determine for each of a specified plurality of possible relative positions and possible relative orientations between the first base 11 and the second base 21, a number of the tuples from the first working area as evaluation variables for which a second end effector 22 of the second robot manipulator 20 is capable of being positioned in a predefined orientation and/or at a predefined distance, in each case relative to the first end effector 12; and determine and output the relative position between the first base 11 and the second base 21 with a highest evaluation variable.

Figure 3:
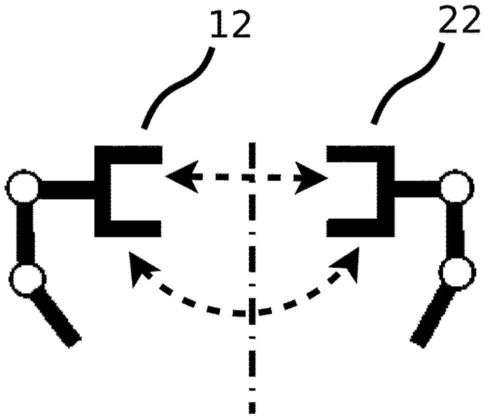
FIG. 3 shows a predetermined relative orientation and distance of the second end effector relative to the first end effector in accordance with the embodiment of the invention illustrated in FIG. 1 or the embodiment illustrated in FIG. 2.

FIG. 3 shows the specified orientation of the second end effector 22 relative to the first end effector 12, which is defined by a half rotation about a reference point of the first end effector 12 such that the first end effector 12 and the second end effector 22 point symmetrically to each other.

Figure 4:
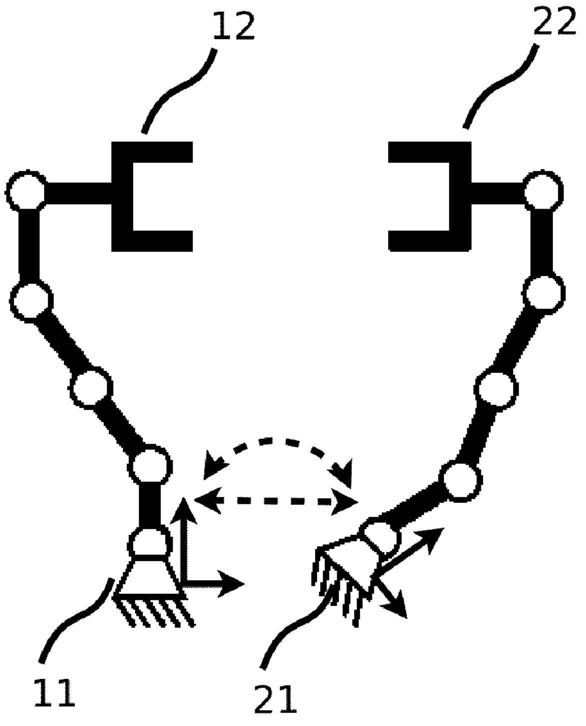
FIG. 4 shows a relative position and a relative orientation of the first base to the second base for the relative orientation and distance of the second end effector relative to the first end effector illustrated in FIG. 3.

FIG. 4 shows a respective possible pose of the first robot manipulator 10 and the second robot manipulator 20 for a particular one of the plurality of possible tuples of the first end effector 12 for which the second end effector 22 of the second robot manipulator 20 is positionable in the predetermined orientation and at the predetermined distance, respectively, relative to the first end effector 12, as shown in FIG. 3. Furthermore, FIG. 4 shows the relative orientation and the relative distance of the first base 11 to the second base 21.

Figure 5:
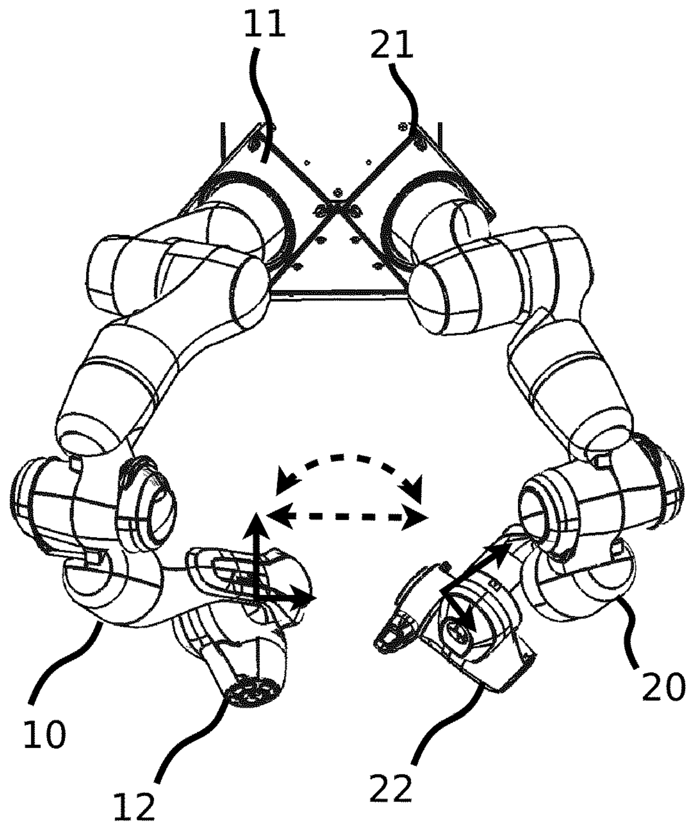
FIG. 5 shows a first robot manipulator and a second robot manipulator as an alternative to the example embodiment of the invention shown in FIG. 2.

FIG. 5 shows a structure including a first robot manipulator 10 and second robot manipulator 20 arranged on a common base, with both robot manipulators 10, 20 shown in plan view. The descriptions of FIGS. 1 to 4 are also applicable to such a structure, particularly when the first robot manipulator 10 and the second robot manipulator 20 are arranged variably and adjustably in their distance from each other or in their relative orientation on the base.

Although the invention has been further illustrated and explained in detail by preferred embodiments, the invention is not limited by the disclosed examples, and other variations may be derived therefrom by those skilled in the art without departing from the scope of protection of the invention. It is therefore clear that a wide variety of possible variations exist. It is also clear that example embodiments mentioned are really only examples, which are not to be understood in any way as limiting, for example, the scope of protection, the possible applications, or the configuration of the invention. Rather, the foregoing description and the figure description enable the person skilled in the art to implement the example embodiments in a specific manner, whereby a person skilled in the art, being aware of the disclosed idea of the invention, can make a variety of changes, for example with respect to the function or the arrangement of individual elements mentioned in an example embodiment, without leaving the scope of protection defined by the claims and their legal equivalents, such as further explanations in the description.

LIST OF REFERENCE NUMERALS

10 first robot manipulator
11 first base
12 first end effector
20 second robot manipulator
21 second base
22 second end effector
30 simulation computing unit
H1 Determine
H2 Determine
H3 Determine and output

The invention claimed is:

1. A robot system comprising:
  - a first robot manipulator comprising a first base;
  - a second robot manipulator comprising a second base, wherein the first robot manipulator and the second robot manipulator are arranged for performing a cooperative task cooperatively; and
  - a computing unit comprising:
    - a processor, and
    - a memory storing instructions that, when executed by the processor, cause the processor to perform operations comprising:
      - determining a first working area of the first robot manipulator, wherein the first working area includes a finite plurality of tuples of possible positions of a first end effector of the first robot manipulator and possible orientations of the first end effector at respective positions of the first end effector, the finite plurality of tuples of the first working area being over a geometric range reachable by the first end effector;

determining, for possible pairs of a specified plurality of possible relative positions of the first base and the second base, a total number of the tuples from the first working area for which a second end effector of the second robot manipulator is capable of being positioned in a predefined position at a distance relative to the first end effector and/or in a predefined orientation at the predefined position relative to the first end effector, the total number of tuples being considered as an evaluation variable in connection with performance of the cooperative task;

determining a selected pair of possible relative positions of the first base and the second base associated with a highest evaluation variable from a plurality of evaluation variables associated respectively with the specified plurality of possible relative positions of the first base and the second base, the highest evaluation variable indicating a largest total number of tuples of cooperative positions and/or orientations of the first end effector and the second end effector; and forming a respective pose of the first robot manipulator and the second robot manipulator in which the first base and the second base are positioned relative to each other according to the selected pair of possible relative positions as determined, so that the first robot manipulator and the second robot manipulator are capable of performing a cooperative task cooperatively.

2. The robot system according to claim 1, wherein the computing unit is included in the first robot manipulator or the second robot manipulator.

3. The robot system according to claim 1, wherein, in determining the total number of tuples as the evaluation variable, the operations comprise checking as to whether a collision would occur between the first robot manipulator and the second robot manipulator.

4. The robot system according to claim 1, wherein the operations comprise defining the predefined orientation of the second end effector of the second robot manipulator relative to the first end effector of the first robot manipulator by a half rotation about a reference point of the first end effector, such that the first end effector and the second end effector point to each other about a vertical axis.

5. The robot system according to claim 1, wherein the operations further comprise:

specifying possible relative positions and possible relative orientations at the possible relative positions of the first base of the first robot manipulator and the second base of the second robot manipulator;

determining the evaluation variable for each pair of the specified plurality of possible relative positions and possible relative orientations at the possible relative positions of the first base and the second base; and determining the selected pair of possible relative positions and possible relative orientations at the possible relative positions of the first base and the second base associated with the highest evaluation variable of the possible relative positions and possible relative orientations at the possible relative positions for positioning the first base and the second base so that the first robot manipulator and the second robot manipulator are capable of performing the cooperative task cooperatively.

6. The robot system according to claim 5, wherein the possible relative positions and/or the possible relative orientations at the possible relative positions of the first base and the second base are specified in a grid.

7. The robot system according to claim 5, wherein the operations comprise specifying the possible relative positions and/or the possible relative orientations at the possible relative positions of the first base and the second base by constrained nonlinear optimization.

8. The robot system according to claim 7, wherein the operations comprise:

determining a second working area of the second robot manipulator, wherein the second working area includes a finite plurality of tuples from possible positions of the second end effector of the second robot manipulator and possible orientations of the second end effector at respective positions of the second end effector, the finite plurality of the tuples of the second working area being over a geometric range reachable by the second end effector, and determining a constraint of the constrained nonlinear optimization based on an intersection of the first working area of the first robot manipulator and the second working area of the second robot manipulator.

9. A robot system comprising:

a first robot manipulator comprising a first base and a first end effector, a second robot manipulator comprising a second base and a second end effector, wherein the first base and the second base are in stationary arrangement to each other, and a control unit configured to:

determine a first working area of the first robot manipulator, wherein the first working area comprises a finite plurality of first tuples from possible positions of the first end effector and possible orientations of the first end effector at the respective positions of the first end effector;

determine a shared working area in which the first end effector and the second end effector are capable of cooperatively completing a task, wherein the shared working area comprises a number of second tuples within the first working area, for which the second end effector of the second robot manipulator is capable of being positioned in at least one of:

a) a predefined position at a distance relative to the first end effector, or b) a predefined orientation at a predefined position relative to the first end effector;

determine, for each of a specified plurality of possible relative positions and possible relative orientations between the first base and the second base, a respective shared working area associated with a respective number of second tuples;

select, from the specified plurality of possible relative positions and possible relative orientations between the first base and the second base, one which has a highest respective number of second tuples; and form a respective pose of the first robot manipulator and the second robot manipulator in which the first base and the second base are positioned according to the one of the possible relative positions and possible relative orientations as selected in connection with performance of the cooperative task cooperatively by the first robot manipulator and the second robot manipulator.

10. A robot system comprising:

a first robot manipulator comprising a first base and a first end effector, a second robot manipulator comprising a second base and a second end effector, wherein the first base and the second base are in stationary arrangement to each other; and a control unit configured to:

determine a first working area of the first robot manipulator, wherein the first working area comprises a finite plurality of first tuples from possible positions of the first end effector and possible orientations of the first end effector at the respective positions of the first end effector;

determine cooperative positions, in which the first end effector and the second end effector are capable of cooperatively completing a task, wherein the cooperative positions comprise a number of second tuples within the first working area, for which the second end effector of the second robot manipulator is capable of being positioned in at least one of:

a) a predefined position at a distance relative to the first end effector, or b) a predefined orientation at a predefined position relative to the first end effector;

determine, for each of a specified plurality of possible relative positions between the first base and the second base, a respective number of cooperative positions;

select, from the specified plurality of possible relative positions between the first base and the second base, one which has a highest respective number of cooperative positions;

form a respective pose of the first robot manipulator and the second robot manipulator in which the first base and the second base are positioned according to the one of possible relative positions as selected in connection with performance of the cooperative task cooperatively by the first robot manipulator and the second robot manipulator; and operate the first end effector and the second end effector such that the first end effector and the second end effector contact a load.

11. A robot system comprising:

a first robot manipulator comprising a first base and a first end effector;

a second robot manipulator comprising a second base and a second end effector, wherein the first base and the second base are in stationary arrangement to each other; and a control unit configured to:

determine a first working area of the first robot manipulator, wherein the first working area comprises a finite plurality of first tuples from possible positions of the first end effector and possible orientations of the first end effector at the respective positions of the first end effector, determine poses of interest within the first working area, in which the first end effector and the second end effector are capable of cooperatively completing a task, wherein cooperative positions comprises a number of second tuples within the first working area, for which a second end effector of the second robot manipulator is capable of being positioned in at least one of:

a) a predefined position at a distance relative to the first end effector, or b) a predefined orientation at a predefined position relative to the first end effector;

for each of a specified plurality of possible relative positions and possible relative orientations between the first base and the second base, include the poses of interest in a respective number of second tuples;

determine, from the specified plurality of possible relative positions and possible relative orientations between the first base and the second base, one which has a highest respective number of second tuples;

form a respective pose of the first robot manipulator and the second robot manipulator in which the first base and the second base are positioned according to the one of the possible relative positions and possible relative orientations as determined in connection with performance of the cooperative task cooperatively by the first robot manipulator and the second robot manipulator; and operate the first end effector and the second end effector such that the first end effector and the second end effector contact a load.

* * * * *